United States Patent
Ewida et al.

(10) Patent No.: US 8,105,022 B2
(45) Date of Patent: Jan. 31, 2012

(54) VANE CONFIGURATIONS FOR STEAM DRYERS

(75) Inventors: Khaled M. Ewida, Wilmington, NC (US); Michael S. Defilippis, Wilmington, NC (US); James P. Carneal, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 459 days.

(21) Appl. No.: 12/385,024

(22) Filed: Mar. 30, 2009

(65) Prior Publication Data
US 2010/0247305 A1    Sep. 30, 2010

(51) Int. Cl.
*F26B 11/02* (2006.01)
(52) U.S. Cl. .......... 415/169.2; 95/272; 55/440; 376/371
(58) Field of Classification Search ............... 415/169.2, 415/185, 169.3, 191, 208.1, 193, 208.2, 209.1, 415/195; 95/272; 55/440; 376/371
See application file for complete search history.

(56) References Cited

U.S. PATENT DOCUMENTS

| | | | | |
|---|---|---|---|---|
| 4,947,485 | A * | 8/1990 | Oosterkamp | 376/210 |
| 5,321,731 | A * | 6/1994 | Oosterkamp | 376/371 |
| 5,634,281 | A * | 6/1997 | Nugent | 34/207 |
| 6,504,888 | B1 * | 1/2003 | Fife et al. | 376/246 |
| 6,810,837 | B2 * | 11/2004 | Lazarus et al. | 122/459 |
| 7,155,841 | B2 * | 1/2007 | Livingston | 34/136 |
| 2009/0274261 | A1 * | 11/2009 | Defilippis et al. | 376/371 |

* cited by examiner

*Primary Examiner* — Gary F. Paumen
(74) *Attorney, Agent, or Firm* — Harness, Dickey & Pierce, P.L.C.

(57) ABSTRACT

A vane configuration for a steam dryer according to an example embodiment of the invention may include a plurality of primary vanes arranged in a radial pattern around (and spaced apart from) a center line. Each of the plurality of primary vanes may be a primary corrugated sheet having alternating primary ridges and primary furrows. As a result, adjacent primary vanes may define a winding flow path, the flow path having an entrance and an exit relative to the center line. The cross-sectional area of the flow path may decrease, increase, or remain constant from the entrance to the exit.

20 Claims, 10 Drawing Sheets

VANE CONFIGURATIONS FOR STEAM DRYERS

BACKGROUND

1. Technical Field

The present disclosure relates to vane configurations for moisture separators in nuclear reactors.

2. Description of Related Art

FIG. 1 is a cross-sectional side view of a conventional reactor pressure vessel. Referring to FIG. 1, a plurality of steam dryers 102 and a plurality of steam separators 104 are arranged in a reactor pressure vessel 100 to remove water droplets from the wet steam flowing out of a reactor core 106. As a result, the wet steam is separated into dry steam and liquid water. The initial steam separation occurs in the steam separators 104, while the remaining steam separation occurs in the steam dryers 102. Dry steam has all of its water molecules in the gaseous state. In contrast, wet steam contains suspended droplets of water, which (at high velocities) can erode the blades of a steam turbine. Accordingly, the dry steam is fed to the turbine (not shown), and the liquid water is recirculated to the reactor core 106.

FIG. 2 is a cutaway, partial perspective view of the reactor pressure vessel of FIG. 1, illustrating the conventional straight steam dryers within the reactor pressure vessel. Referring to FIG. 2, the straight steam dryers 102 each have an elongated body and are arranged in parallel. Wet steam enters the steam dryers 102 from below and exits as dry steam through the vertical steam outlet surface of each steam dryer 102. The steam dryers 102 are oriented such that steam outlet surfaces face the center of the reactor pressure vessel 100.

FIG. 3 is a cutaway perspective view of one of the conventional straight steam dryers illustrated in FIGS. 1-2. Referring to FIG. 3, the steam dryer 102 has a sloping hood 130 on one side of its elongated body and a vertical steam outlet surface on the other side of its elongated body. A plurality of corrugated plates 134 are arranged within the steam dryer 102 to form steam passages between the corrugated plates 134. The corrugated plates 134 are aligned so as to be parallel to each other while being perpendicular to the longitudinal axis of the elongated body of the steam dryer 102. Perforated plates 132 are also provided on the hood side and the steam outlet side of the steam dryer 102 to guard the entrances and exits of the steam passages, respectively.

During the operation of the nuclear reactor, wet steam enters the steam dryer 102 from underneath. The wet steam initially moves upward under the hood 130 of the steam dryer 102 and passes through the perforated plate 132 into the steam passages. Due to the corrugated plates 134, the flow direction of the wet steam changes numerous times as it travels through the steam passages. The numerous direction changes within the steam passages are obstacles for the heavier water droplets in the wet steam. As a result, dry steam exits the steam passages and passes through the perforated plate of the steam outlet surface of the steam dryer 102. However, conventional straight steam dryers have a low natural frequency and are prone to cracks due to fatigue caused by excitation sources in the system.

SUMMARY

A vane configuration for a steam dryer according to an example embodiment of the invention may include a plurality of primary vanes arranged in a radial pattern around (and spaced apart from) a center line, each of the plurality of primary vanes being a primary corrugated sheet having alternating primary ridges and primary furrows, and adjacent primary vanes defining a winding flow path, the flow path having an entrance and an exit relative to the center line.

A method of configuring vanes for a steam dryer according to an example embodiment of the invention may include arranging a plurality of primary vanes in a radial pattern around (and spaced apart from) a center line, each of the plurality of primary vanes being a primary corrugated sheet having alternating primary ridges and primary furrows, and adjacent primary vanes defining a winding flow path, the flow path having an entrance and an exit relative to the center line.

BRIEF DESCRIPTION OF THE DRAWINGS

The features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
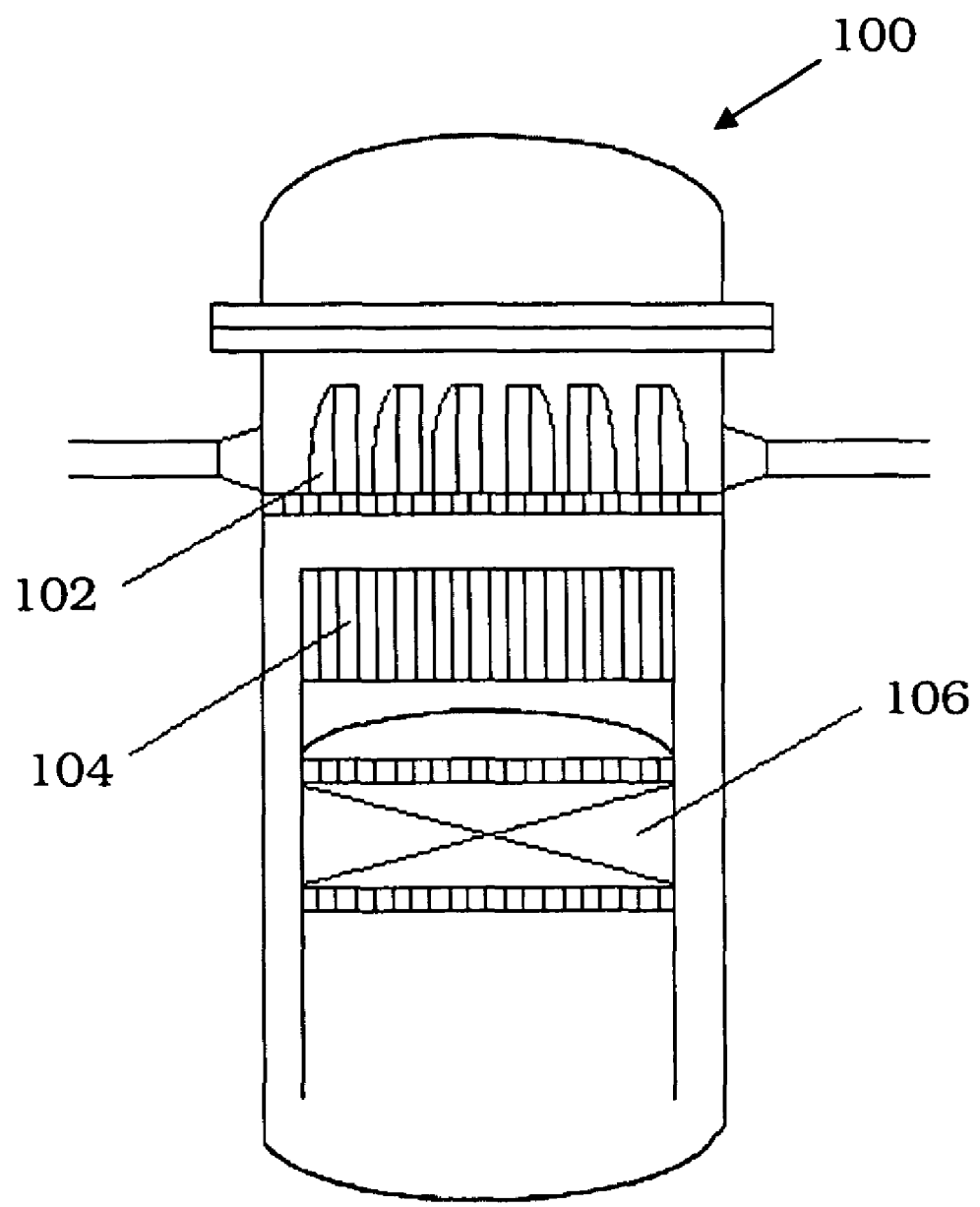
FIG. 1 is a cross-sectional side view of a conventional reactor pressure vessel.
Figure 2:
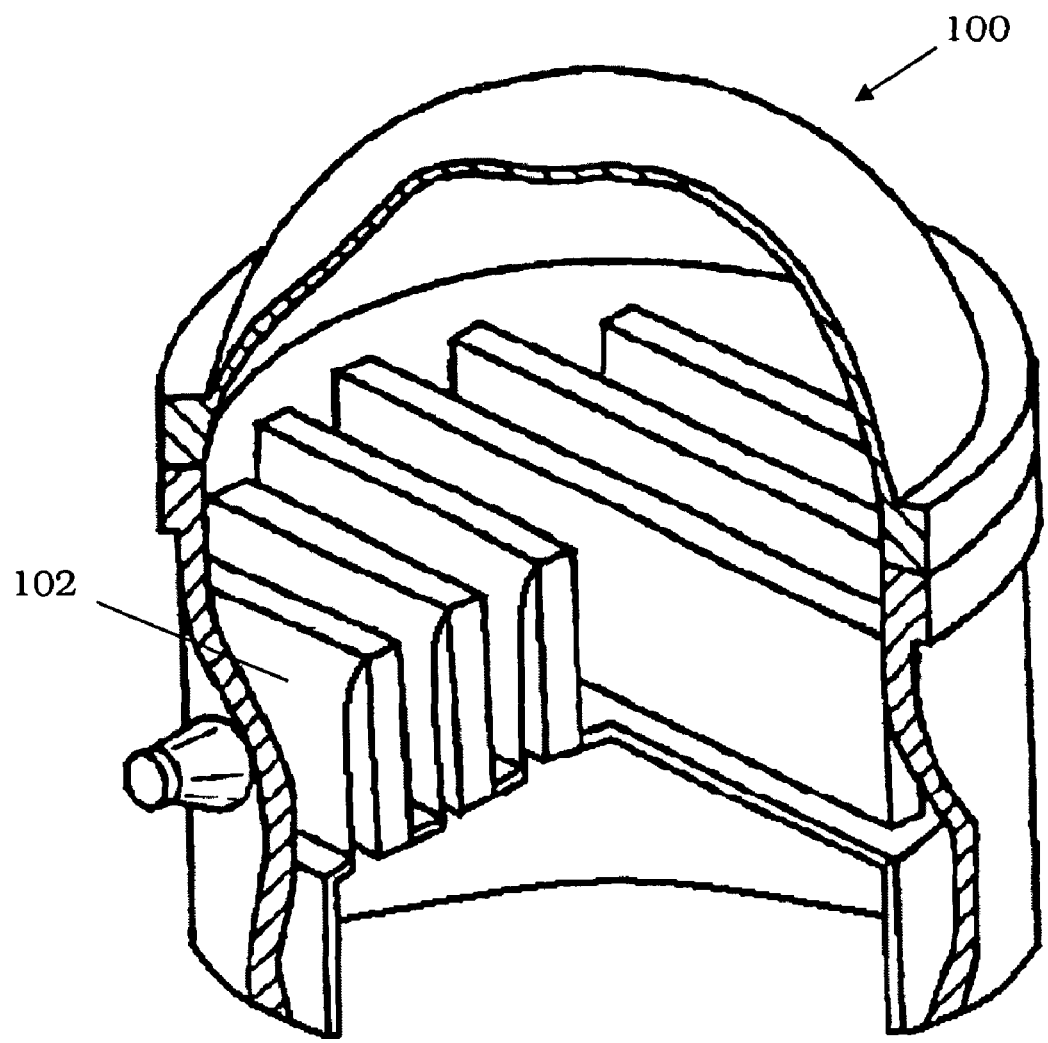
FIG. 2 is a cutaway, partial perspective view of the reactor pressure vessel of FIG. 1, illustrating the conventional straight steam dryers within the reactor pressure vessel.
Figure 3:
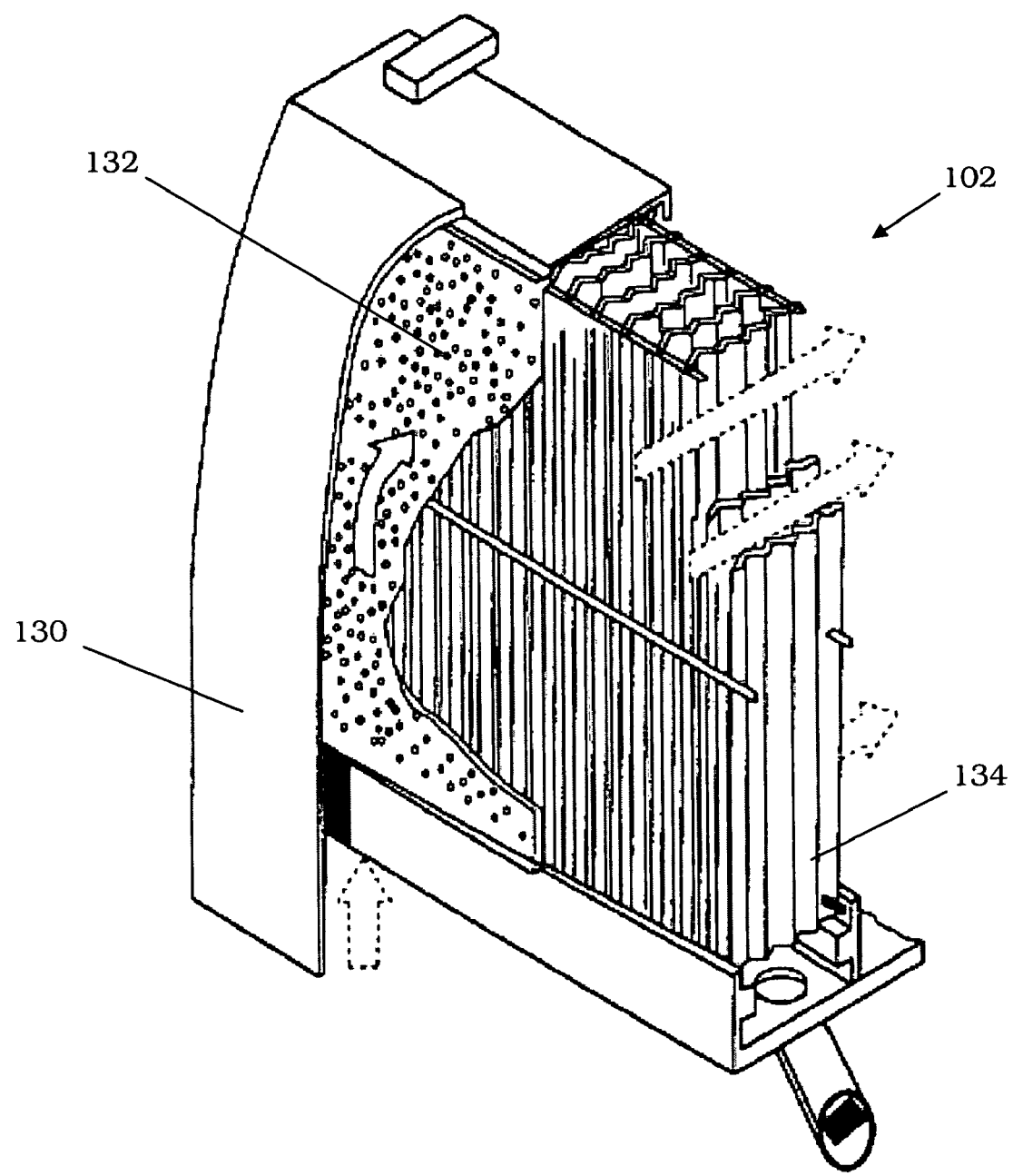
FIG. 3 is a cutaway perspective view of one of the conventional straight steam dryers illustrated in FIGS. 1-2.

It should be understood that when an element or layer is referred to as being "on", "connected to", "coupled to", or "covering" another element or layer, it may be directly on, connected to, coupled to, or covering the other element or layer or intervening elements or layers may be present. In contrast, when an element is referred to as being "directly on", "directly connected to", or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper", and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Circular dryers may have a higher natural frequency than conventional straight dryers due to the more robust circular design. As a result, circular dryers may have a higher resistance to cracks compared to conventional straight dryers. A plurality of circular dryers may be concentrically arranged to form a dryer bank for a reactor pressure vessel.

Figure 4:
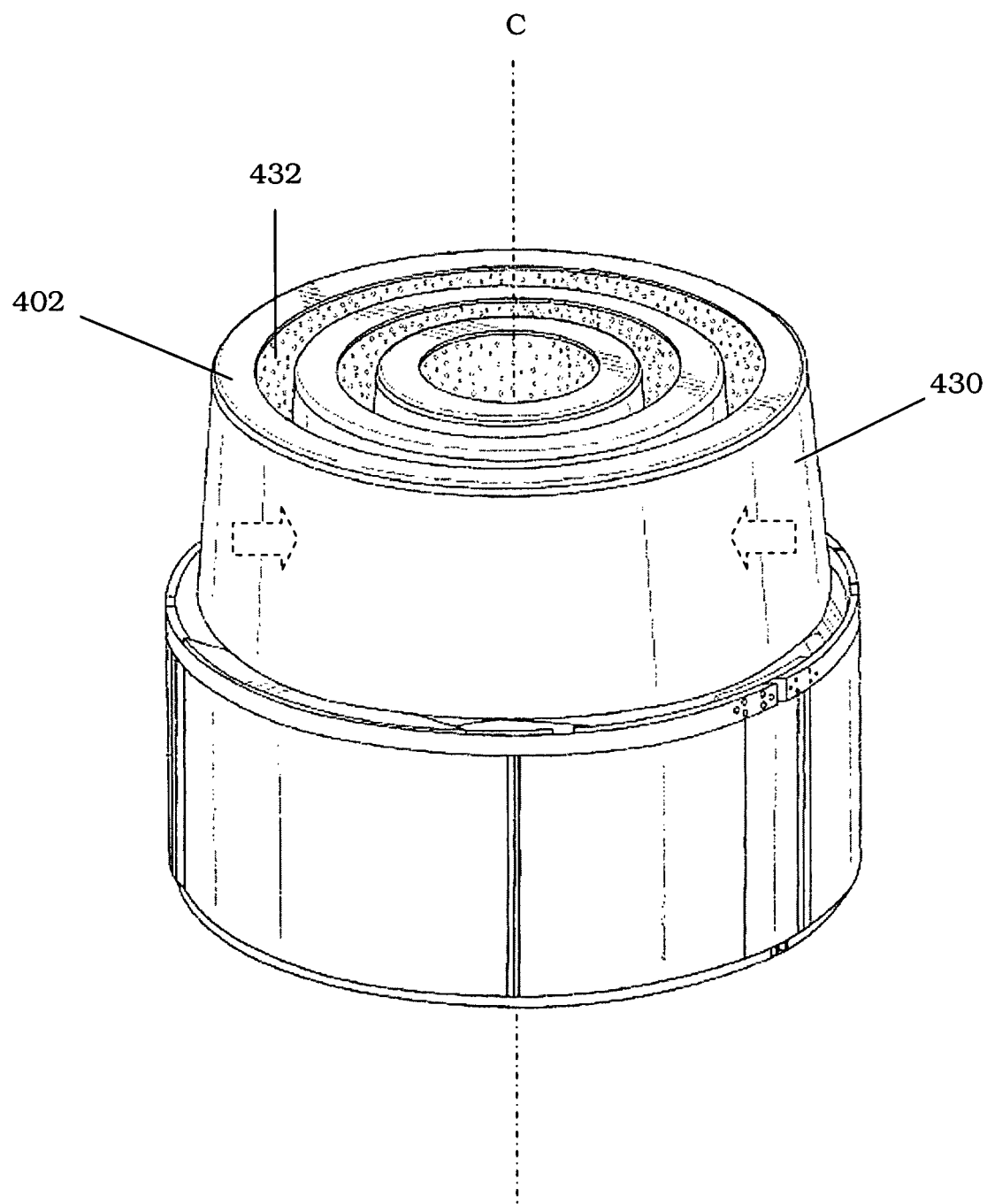
FIG. 4 is a perspective view of a circular steam dryer according to an example embodiment of the invention.

FIG. 4 is a perspective view of a circular steam dryer according to an example embodiment of the invention. Referring to FIG. 4, the circular steam dryer 402 has an annular body with a sloping hood 430 as its outer sidewall and a perforated plate 432 as its inner sidewall. A plurality of dryer vanes may be arranged within the circular steam dryer 402 (between the hood 430 and the perforated plate 432) to facilitate the output of dry steam. Although the surface of the hood 430 is illustrated in FIG. 4 as being inclined, it should be understood that other embodiments are possible. For example, the surface of the hood 430 may be vertically provided.

As shown in FIG. 4, a plurality of circular steam dryers may be concentrically arranged about a center line C to form a steam dryer bank. Thus, the inner circular steam dryers will be smaller than the outer circular steam dryers to allow the concentric arrangement.

During operation of the steam dryer bank, wet steam enters the individual circular steam dryers from below. For instance, with regard to the circular steam dryer 402, the wet steam initially rises upward under the hood 430 and travels through the dryer vanes (not shown) within the circular steam dryer 402. Water droplets are removed from the wet steam as it travels through the dryer vanes (not shown). As a result, dry steam exits the dryer vanes (not shown) and passes out of the perforated plate 432 of the circular steam dryer 402 toward the center line C of the steam dryer bank.

Figure 5:
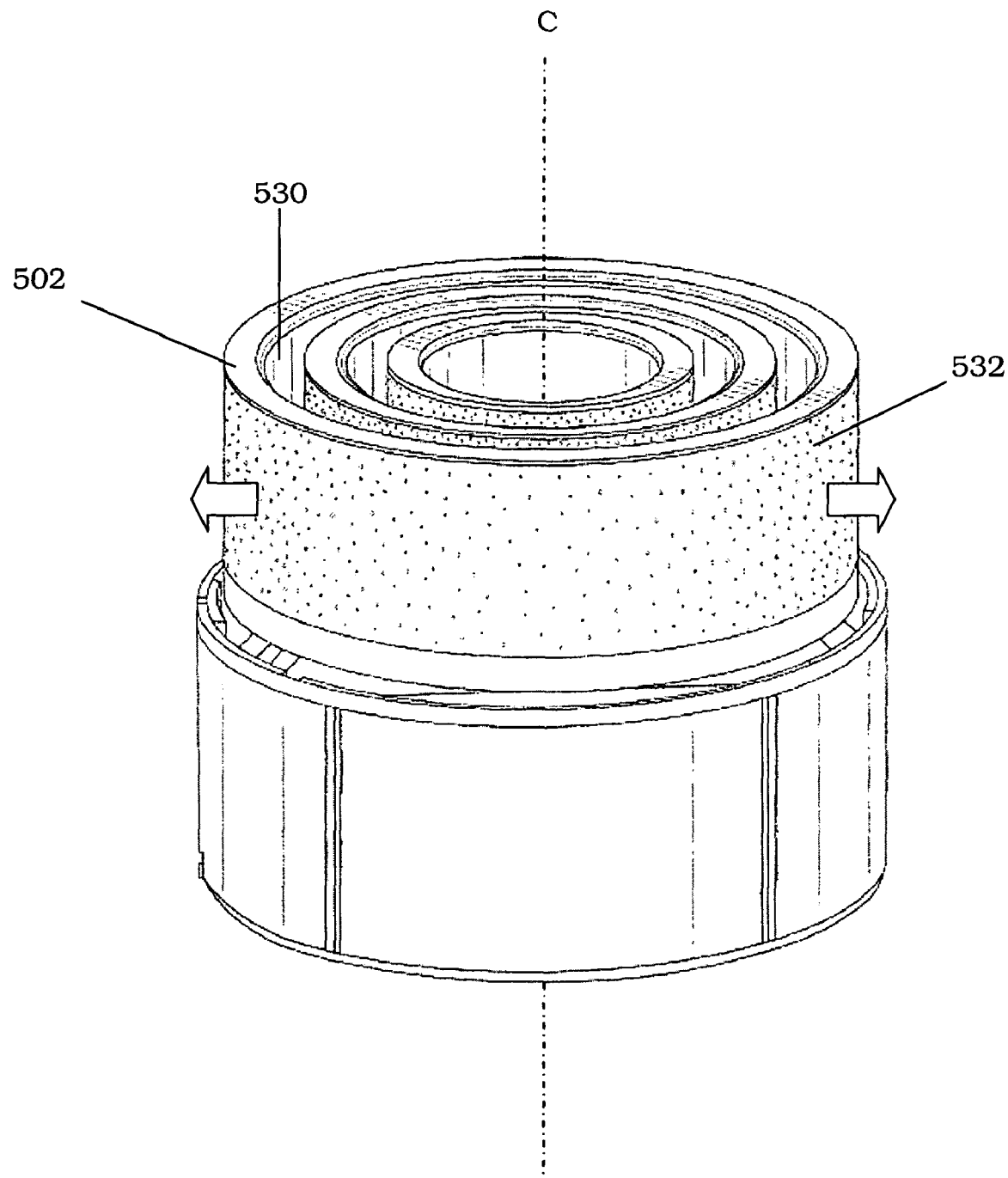
FIG. 5 is a perspective view of another circular steam dryer according to an example embodiment of the invention.

FIG. 5 is a perspective view of another circular steam dryer according to an example embodiment of the invention. Referring to FIG. 5, the circular steam dryer 502 has an annular body with a hood 530 as its inner sidewall and a perforated plate 532 as its outer sidewall. A plurality of dryer vanes may be arranged within the circular steam dryer 502 (between the hood 530 and the perforated plate 532) to facilitate the output of dry steam.

As shown in FIG. 5, a plurality of circular steam dryers may be concentrically arranged about a center line C to form a steam dryer bank. Thus, the inner circular steam dryers will be smaller than the outer circular steam dryers to allow the concentric arrangement.

During operation of the steam dryer bank, wet steam enters the individual circular steam dryers from below. For instance, with regard to the circular steam dryer 502, the wet steam initially rises upward under the hood 530 and travels through the dryer vanes (not shown) within the circular steam dryer 502. Water droplets are removed from the wet steam as it travels through the dryer vanes (not shown). As a result, dry steam exits the dryer vanes (not shown) and passes out of the perforated plate 532 of the circular steam dryer 502 away from the center line C of the steam dryer bank.

Although the circular steam dryers are illustrated in FIGS. 4-5 as being the same height, it should be understood that other embodiments are possible. For example, the height of the circular steam dryers may increase with decreasing distance toward the center line C of the steam dryer bank. Conversely, the height of the circular steam dryers may decrease with decreasing distance toward the center line C of the steam dryer bank.

Figure 6:
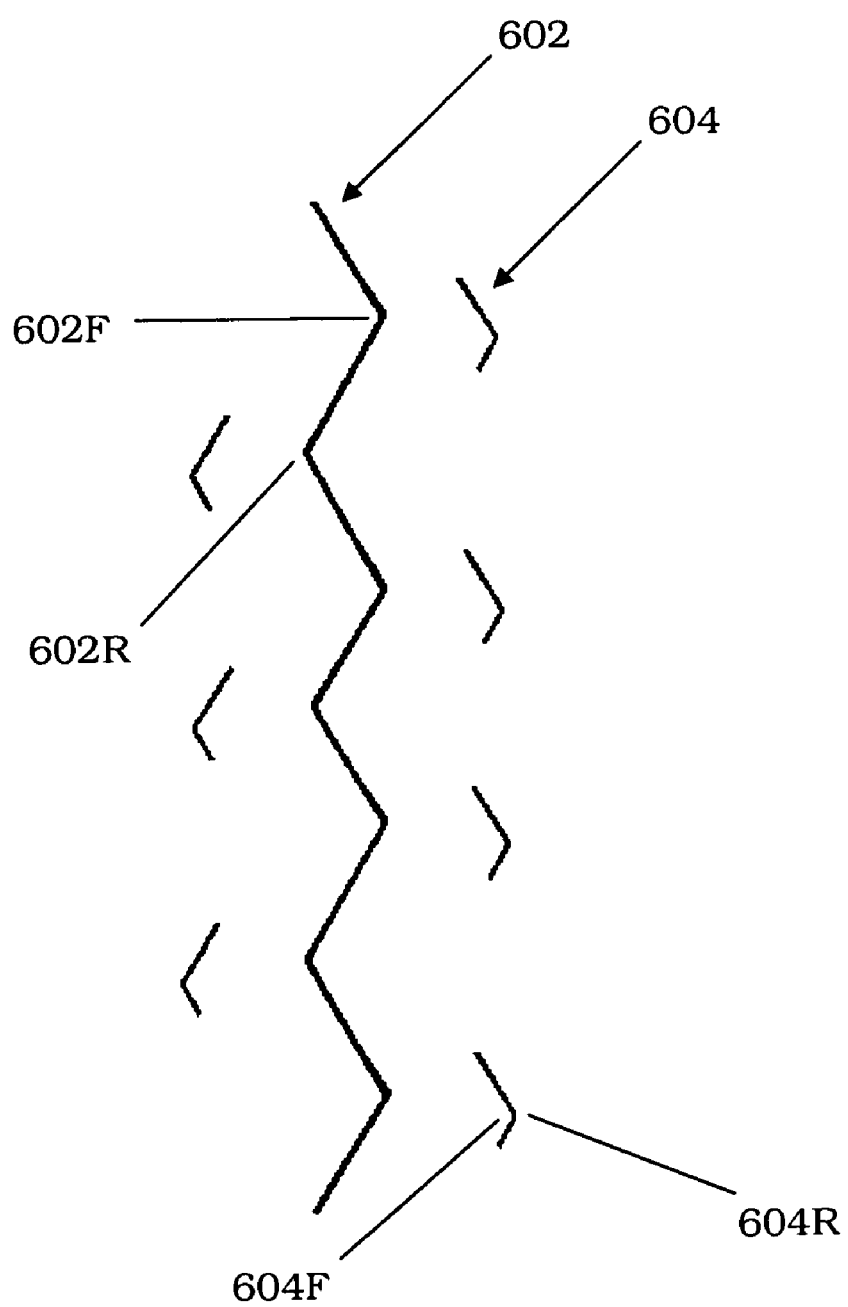
FIG. 6 is an exploded, plan view of a dryer vane for a steam dryer according to an example embodiment of the invention.

FIG. 6 is an exploded, plan view of a dryer vane for a steam dryer according to an example embodiment of the invention. Referring to FIG. 6, the dryer vane includes a primary vane 602 and a plurality of secondary vanes 604. The primary vane 602 is a primary corrugated sheet having alternating primary ridges 602R and primary furrows 602F. Similarly, each of the secondary vanes 604 is a secondary corrugated sheet having a secondary ridge 604R and a corresponding secondary furrow 604F (although a plurality of secondary ridges and furrows may be optionally provided). The primary and secondary corrugated sheets may be formed of a suitable material (e.g., stainless steel). Although not shown in FIG. 6, the plurality of secondary vanes 604 may be appended (e.g., welded) to the primary vane 602. A plurality of the dryer vanes may be arranged in a suitable configuration for use in a steam dryer.

Figure 7:
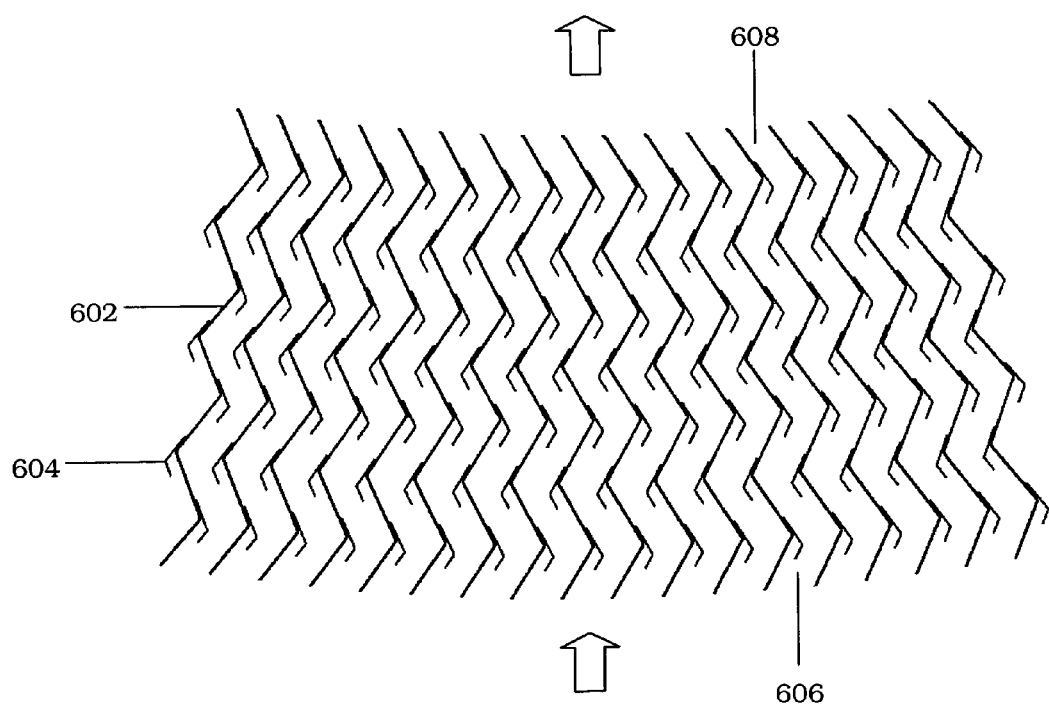
FIG. 7 is a partial plan view of a vane configuration for the steam dryer of FIG. 4.

FIG. 7 is a partial plan view of a vane configuration for the steam dryer of FIG. 4. Referring to FIG. 7, the vane configuration includes a plurality of primary vanes 602 arranged in a radial pattern around (and spaced apart from) a center line C. The vane configuration may be situated within the annular body of the circular steam dryer 402 of FIG. 4.

Each of the primary vanes 602 is a primary corrugated sheet (e.g., stainless steel) having alternating primary ridges and primary furrows. As a result, adjacent primary vanes 602 will define a winding flow path having an entrance 606 and an exit 608. As illustrated in FIG. 7, the cross-sectional area of the flow path decreases from the entrance 606 to the exit 608, the exit 608 being at a smaller radial distance from the center line C than the entrance 606.

Alternatively, the primary vanes 602 may be manipulated to compensate for the radial convergence of the vane configuration so as to achieve a relatively constant cross-sectional area for the flow path from the entrance 606 to the exit 608. For example, the primary vanes 602 may be manipulated such that the angle of each primary furrow of the primary vanes 602 increases from the entrance 606 to the exit 608 of the flow path, the exit 608 being at a smaller radial distance from the center line C than the entrance 606.

A plurality of secondary vanes 604 may be appended (e.g., welded) to the primary vanes 602, the secondary vanes 604 extending into flow paths defined by adjacent primary vanes 602. Each of the secondary vanes 604 is a secondary corrugated sheet (e.g., stainless steel) having a first surface associated with a secondary ridge 604R and an opposing second surface associated with a corresponding secondary furrow 604F, the second surface being adjoined to a primary ridge 602R of a primary vane 602 such that the secondary ridge 604R is oriented in the same direction as the primary ridge 602R while being spaced apart from the primary ridge 602R by an offset distance. The offset distance may decrease from the entrance 606 to the exit 608 of the flow path, the exit 608 being at a smaller radial distance from the center line C than the entrance 606.

Due to the winding flow paths, the flow direction of the wet steam changes numerous times as it travels through the vane configuration. The numerous direction changes within the vane configuration are obstacles for the heavier water droplets in the wet steam. As a result, dry steam exits the vane configuration and passes through the perforated plate 432 of the steam dryer 402 of FIG. 4.

Figure 8:
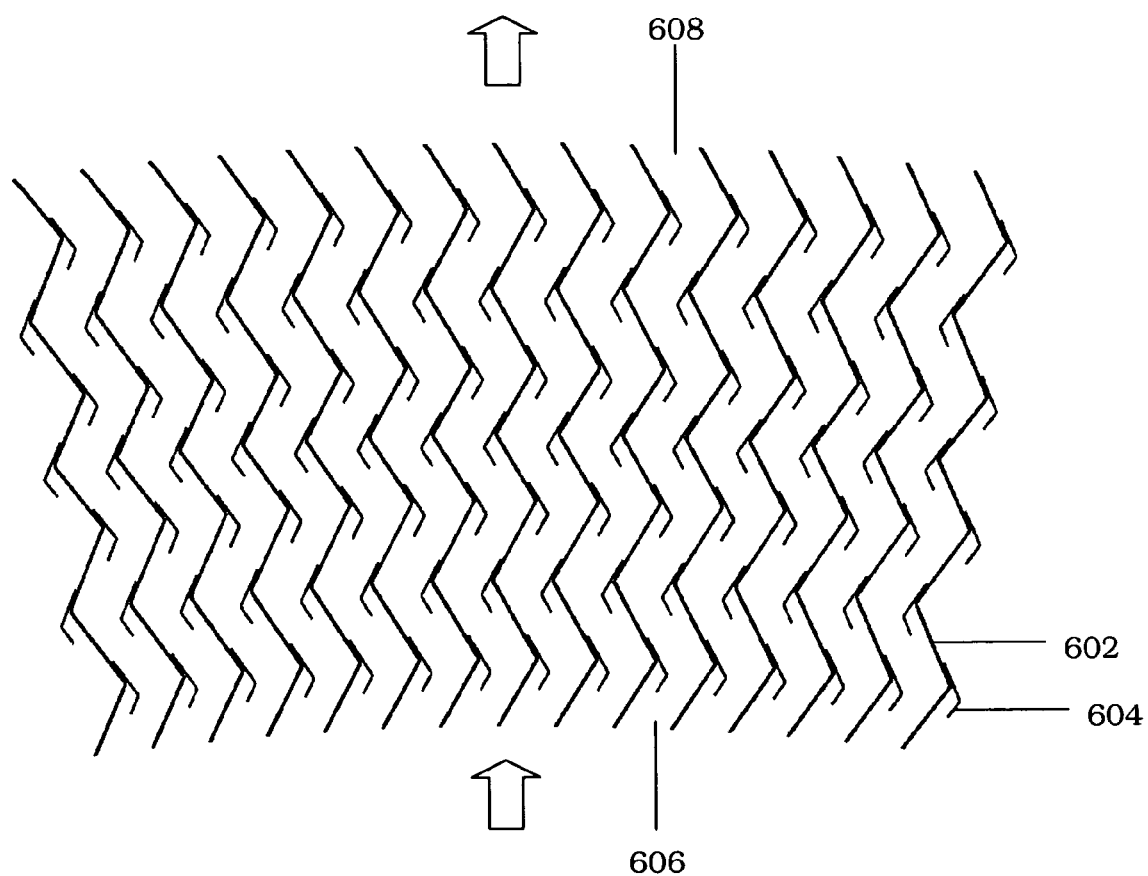
FIG. 8 is a partial plan view of a vane configuration for the steam dryer of FIG. 5.

FIG. 8 is a partial plan view of a vane configuration for the steam dryer of FIG. 5. Referring to FIG. 8, the vane configuration includes a plurality of primary vanes 602 with a plurality of secondary vanes 604 appended thereto. The primary vanes 602 are arranged in a radial pattern around (and spaced apart from) a center line C. The vane configuration may be situated within the annular body of the circular steam dryer 502 of FIG. 5.

The primary vanes 602 and secondary vanes 604 may be as described above in connection with FIG. 7. However, the characteristics of the flow path defined by adjacent primary vanes 602 may differ from that of FIG. 7, at least by virtue of the use of the vane configuration of FIG. 8 in connection with the circular steam dryer 502 of FIG. 5. As illustrated in FIG. 8, the vane configuration is such that the cross-sectional area of the flow path increases from the entrance 606 to the exit 608, the exit 608 being at a greater radial distance from the center line C than the entrance 606. The offset distance (between the secondary ridge of the secondary vane 604 and the primary ridge of the primary vane 602) may also increase from the entrance 606 to the exit 608 of the flow path, the exit 608 being at a greater radial distance from the center line C than the entrance 606.

Alternatively, the primary vanes 602 may be manipulated to compensate for the radial divergence of the vane configuration so as to achieve a relatively constant cross-sectional area for the flow path from the entrance 606 to the exit 608. For example, the primary vanes 602 may be manipulated such that the angle of each primary furrow of the primary vanes 602 decreases from the entrance 606 to the exit 608 of the flow path, the exit 608 being at a greater radial distance from the center line C than the entrance 606.

Figure 9:
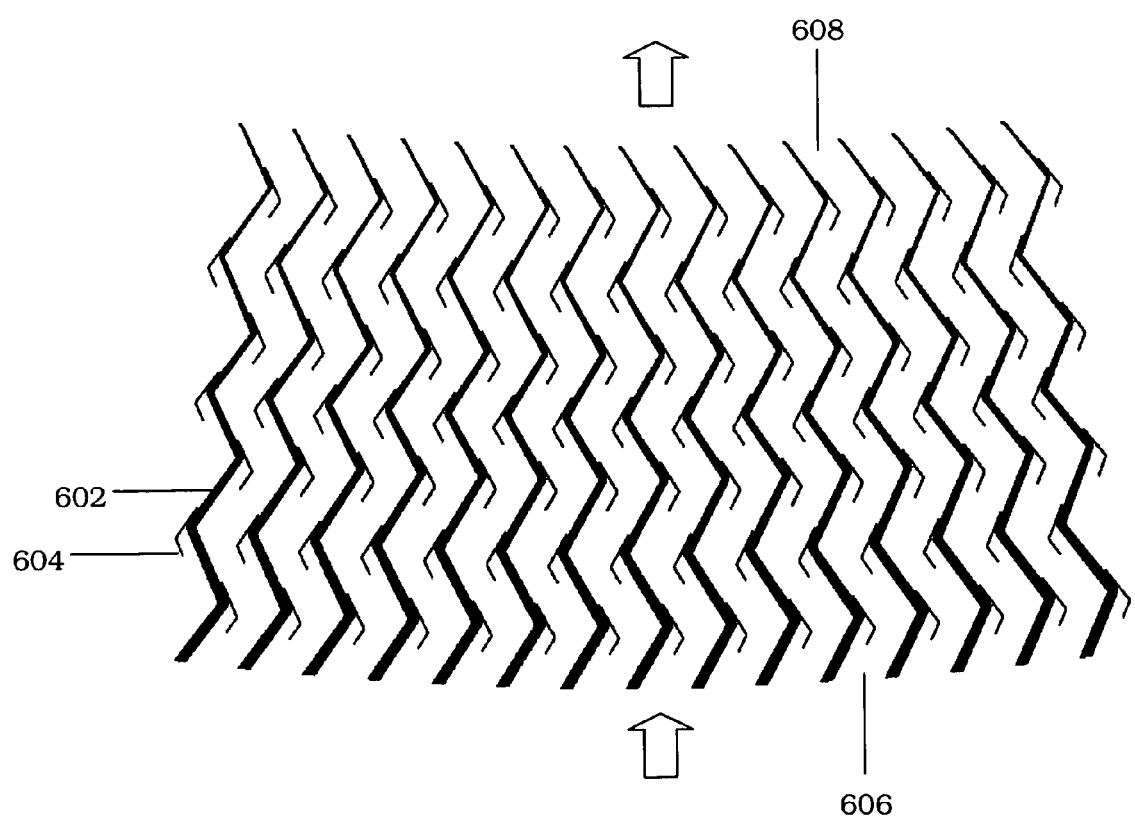
FIG. 9 is a partial plan view of another vane configuration for the steam dryer of FIG. 4.

FIG. 9 is a partial plan view of another vane configuration for the steam dryer of FIG. 4. Referring to FIG. 9, the vane configuration includes a plurality of primary vanes 602 with a plurality of secondary vanes 604 appended thereto. The primary vanes 602 are arranged in a radial pattern around (and spaced apart from) a center line C. The vane configuration may be situated within the annular body of the circular steam dryer 402 of FIG. 4.

The primary vanes 602 and secondary vanes 604 may be as described above in connection with FIG. 7. However, unlike FIG. 7, the primary vanes 602 of FIG. 9 decrease in thickness from the entrance 606 to the exit 608 of the flow path, the exit 608 being at a smaller radial distance from the center line C than the entrance 606. Because the decreasing thickness of the primary vanes 602 compensates for the radial convergence of the vane configuration, the cross-sectional area of the flow path remains relatively constant from the entrance 606 to the exit 608.

Figure 10:
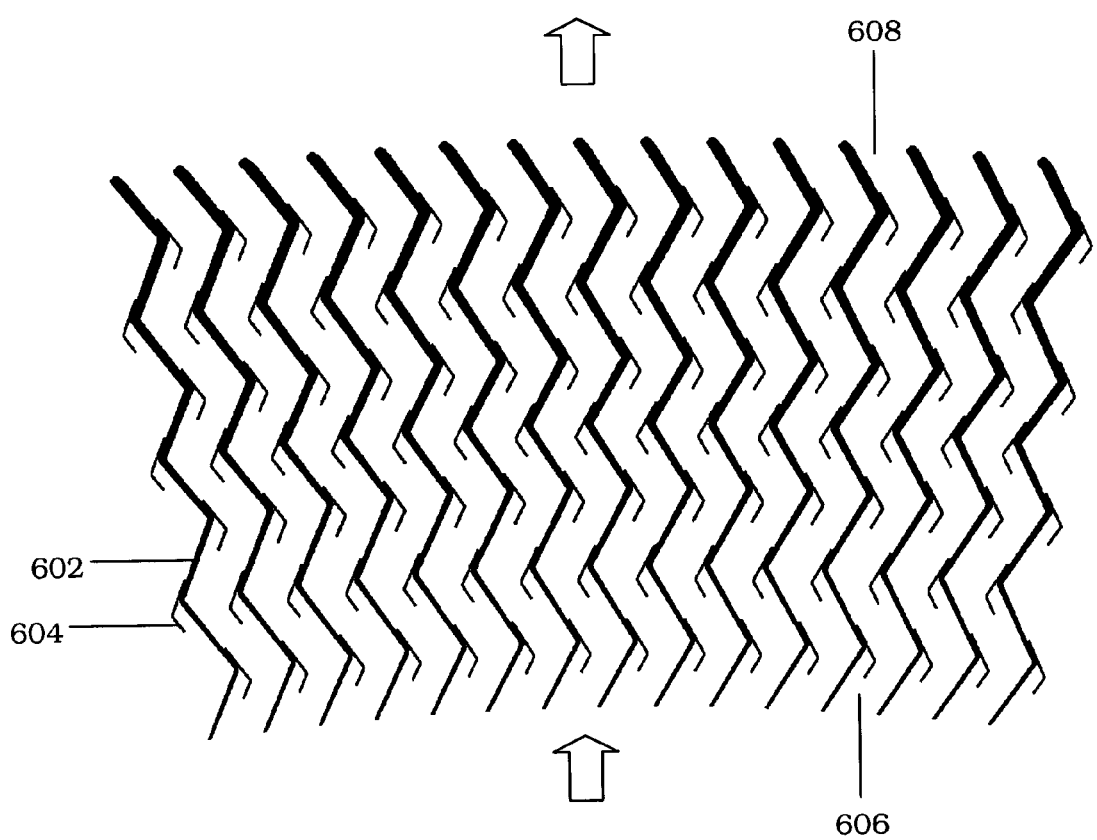
FIG. 10 is a partial plan view of another vane configuration for the steam dryer of FIG. 5.

FIG. 10 is a partial plan view of another vane configuration for the steam dryer of FIG. 5. Referring to FIG. 10, the vane configuration includes a plurality of primary vanes 602 with a plurality of secondary vanes 604 appended thereto. The primary vanes 602 are arranged in a radial pattern around (and spaced apart from) a center line C. The vane configuration may be situated within the annular body of the circular steam dryer 502 of FIG. 5.

The primary vanes 602 and secondary vanes 604 may be as described above in connection with FIG. 7, while the vane configuration may resemble that of FIG. 8. However, unlike FIG. 8, the primary vanes 602 of FIG. 10 increase in thickness from the entrance 606 to the exit 608 of the flow path, the exit 608 being at a greater radial distance from the center line C than the entrance 606. Because the increasing thickness of the primary vanes 602 compensates for the radial divergence of the vane configuration, the cross-sectional area of the flow path remains relatively constant from the entrance 606 to the exit 608.

A method of configuring vanes for a steam dryer according to an example embodiment of the invention may include arranging a plurality of primary vanes in a radial pattern around (and spaced apart from) a center line. Each of the plurality of primary vanes may be a primary corrugated sheet having alternating primary ridges and primary furrows. As a result, adjacent primary vanes may define a winding flow path, the flow path having an entrance and an exit relative to the center line.

The cross-sectional area of the flow path may be varied (e.g., increased, decreased) from the entrance to the exit. Additionally, the thickness of the primary vanes may be varied (e.g., increased, decreased) from the entrance to the exit of the flow path. Furthermore, the angle of each primary furrow of the primary vanes may be varied (e.g., increased, decreased) from the entrance to the exit of the flow path. Variations to the flow path cross-sectional area, the primary vane thickness, and the primary furrow angle may be implemented separately or in combination.

A plurality of secondary vanes may also be appended to the primary vanes such that the secondary vanes extend into flow paths defined by adjacent primary vanes. Each of the secondary vanes may be a secondary corrugated sheet having a first surface associated with a secondary ridge and an opposing second surface associated with a corresponding secondary furrow. The second surface of the secondary vane may be adjoined to a primary ridge of a primary vane such that the secondary ridge is oriented in the same direction as the primary ridge while being spaced apart from the primary ridge by an offset distance. The offset distance may be varied (e.g., increased, decreased) from the entrance to the exit of the flow path.

While a number of example embodiments have been disclosed herein, it should be understood that other variations may be possible. For instance, although the above examples are discussed in the context of circular dryers, it should be understood that the teachings herein may also be applied to straight dryers. Such variations are not to be regarded as a departure from the spirit and scope of the present disclosure, and all such modifications as would be obvious to one skilled in the art are intended to be included within the scope of the following claims.

The invention claimed is:

1. A vane configuration for a steam dryer, comprising:
a plurality of primary vanes arranged in a radial pattern around a center line, the primary vanes being spaced from the center line, each of the plurality of primary vanes being a primary corrugated sheet having alternating primary ridges and primary furrows, and adjacent primary vanes defining a winding flow path, the flow path having an entrance and an exit relative to the center line.

2. The vane configuration of claim 1, wherein a cross-sectional area of the flow path decreases from the entrance to the exit, the exit being at a smaller radial distance from the center line than the entrance.

3. The vane configuration of claim 1, wherein a cross-sectional area of the flow path increases from the entrance to the exit, the exit being at a greater radial distance from the center line than the entrance.

4. The vane configuration of claim 1, wherein the primary vanes decrease in thickness from the entrance to the exit of the flow path, the exit being at a smaller radial distance from the center line than the entrance.

5. The vane configuration of claim 1, wherein the primary vanes increase in thickness from the entrance to the exit of the flow path, the exit being at a greater radial distance from the center line than the entrance.

6. The vane configuration of claim 1, wherein an angle of each primary furrow of the primary vanes increases from the entrance to the exit of the flow path, the exit being at a smaller radial distance from the center line than the entrance.

7. The vane configuration of claim 1, wherein an angle of each primary furrow of the primary vanes decreases from the entrance to the exit of the flow path, the exit being at a greater radial distance from the center line than the entrance.

8. The vane configuration of claim 1, further comprising:
a plurality of secondary vanes appended to the primary vanes, the secondary vanes extending into flow paths defined by adjacent primary vanes.

9. The vane configuration of claim 8, wherein each of the secondary vanes is a secondary corrugated sheet having a first surface associated with a secondary ridge and an opposing second surface associated with a corresponding secondary furrow, the second surface being adjoined to a primary ridge of a primary vane such that the secondary ridge is oriented in the same direction as the primary ridge while being spaced from the primary ridge by an offset distance.

10. The vane configuration of claim 9, wherein the offset distance decreases from the entrance to the exit of the flow path, the exit being at a smaller radial distance from the center line than the entrance.

11. The vane configuration of claim 9, wherein the offset distance increases from the entrance to the exit of the flow path, the exit being at a greater radial distance from the center line than the entrance.

12. A method of configuring vanes for a steam dryer, comprising:
arranging a plurality of primary vanes in a radial, pattern around a center line, the primary vanes being spaced from the center line, each of the plurality of primary vanes being a primary corrugated sheet having alternating primary ridges and primary furrows, and adjacent primary vanes defining a winding flow path, the flow path having an entrance and an exit relative to the center line.

13. The method of claim 12, further comprising:
varying a cross-sectional area of the flow path from the entrance to the exit.

14. The method of claim 12, further comprising:
decreasing a thickness of the primary vanes from the entrance to the exit of the flow path, the exit being at a smaller radial distance from the center line than the entrance.

15. The method of claim 12, further comprising:
increasing a thickness of the primary vanes from the entrance to the exit of the flow path, the exit being at a greater radial distance from the center line than the entrance.

16. The method of claim 12, further comprising:
increasing an angle of each primary furrow of the primary vanes from the entrance to the exit of the flow path, the exit being at a smaller radial distance from the center line than the entrance.

17. The method of claim 12, further comprising:
decreasing an angle of each primary furrow of the primary vanes from the entrance to the exit of the flow path, the exit being at a greater radial distance from the center line than the entrance.

18. The method of claim 12, further comprising:
appending a plurality of secondary vanes to the primary vanes such that the secondary vanes extend into flow paths defined by adjacent primary vanes, each of the secondary vanes being a secondary corrugated sheet having a first surface associated with a secondary ridge and an opposing second surface associated with a corresponding secondary furrow, the second surface being adjoined to a primary ridge of a primary vane such that the secondary ridge is oriented in the same direction as the primary ridge while being spaced from the primary ridge by an offset distance.

19. The method of claim 18, further comprising:
decreasing the offset distance from the entrance to the exit of the flow path, the exit being at a smaller radial distance from the center line than the entrance.

20. The method of claim 18, further comprising:
increasing the offset distance from the entrance to the exit of the flow path, the exit being at a greater radial distance from the center line than the entrance.

* * * * *